June 8, 1965   W. L. MORGAN   3,187,422
REINFORCEMENT OF METAL
Original Filed Aug. 27, 1956   4 Sheets-Sheet 1

INVENTOR.
WILLARD L. MORGAN
BY
ATTORNEYS

June 8, 1965     W. L. MORGAN     3,187,422
REINFORCEMENT OF METAL
Original Filed Aug. 27, 1956     4 Sheets-Sheet 2
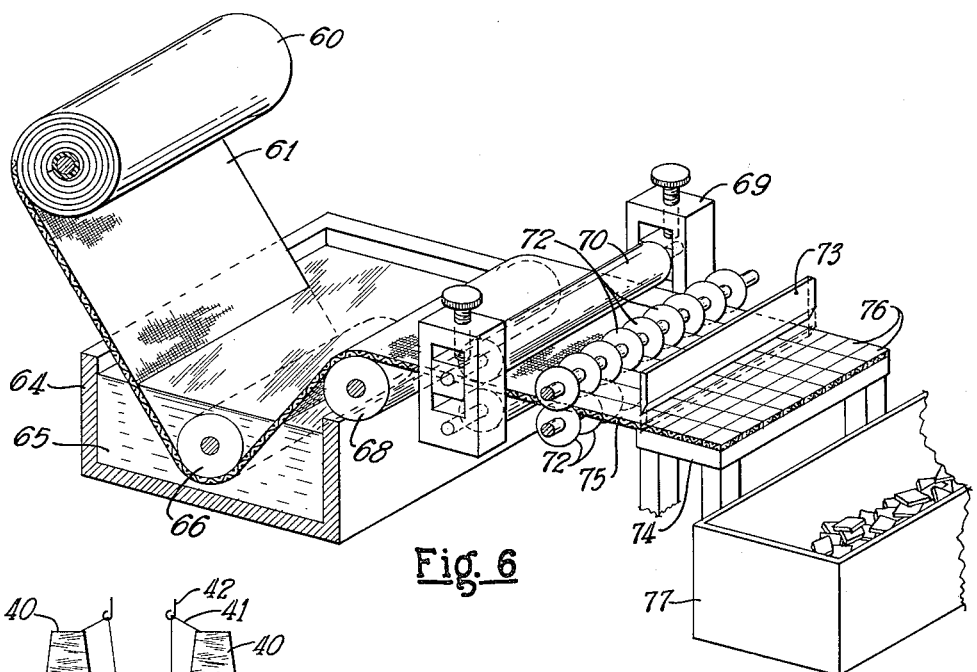
Fig. 6
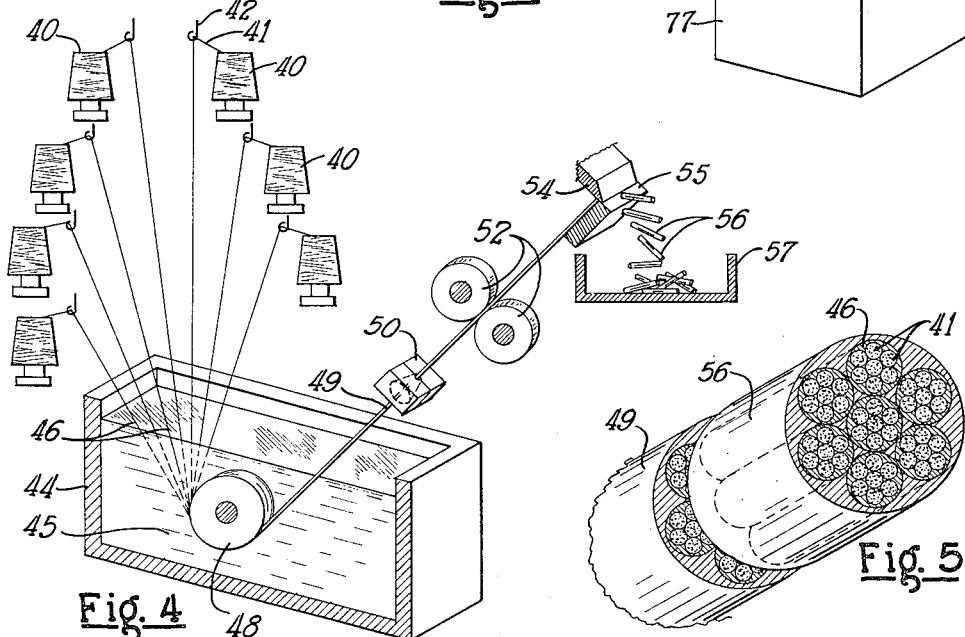
Fig. 4
Fig. 5
INVENTOR.
WILLARD L. MORGAN
BY
ATTORNEYS

INVENTOR.
WILLARD L. MORGAN

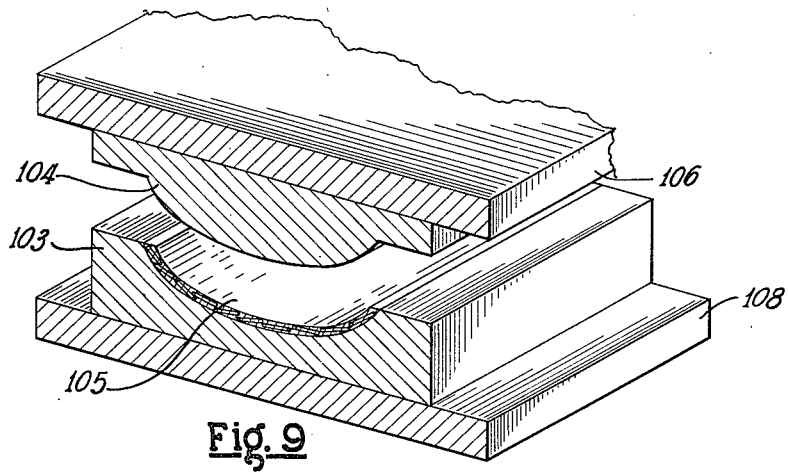
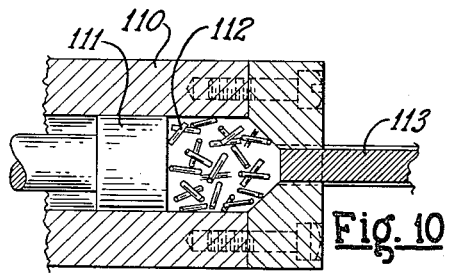
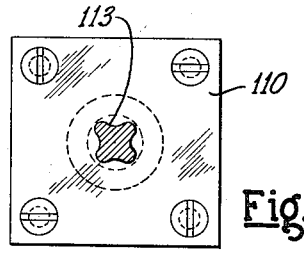
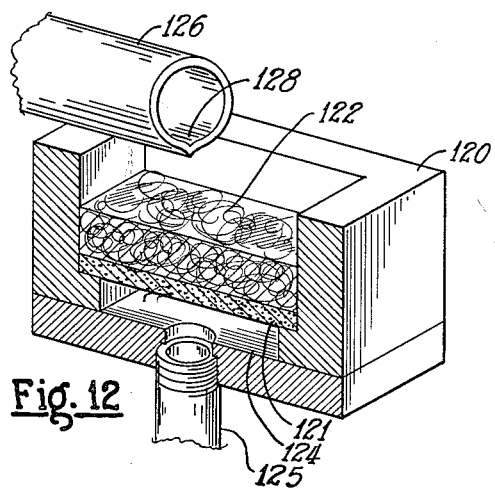
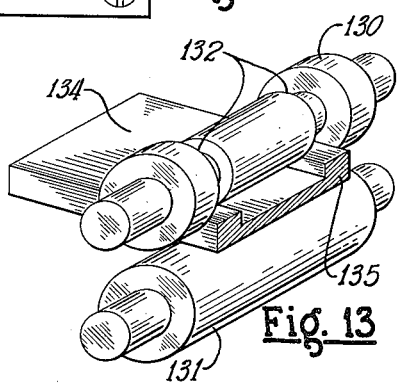

3,187,422
REINFORCEMENT OF METAL
Willard L. Morgan, Newark, Ohio, assignor to Owens-Corning Fiberglas Corporation, a corporation of Delaware
Original application Aug. 27, 1956, Ser. No. 606,293, now Patent No. 2,953,849, dated Sept. 27, 1960. Divided and this application Dec. 8, 1959, Ser. No. 858,255
9 Claims. (Cl. 29—419)

This invention is related to reinforcement of metals with mineral fibers and more particularly to a method for reinforcing metal products with glass fibers in metal working processes.

This is a division of my previous application, Serial No. 606,293, filed on August 27, 1956, and issued as Patent 2,953,849 on September 27, 1960.

Glass in fibrous form, it is well known, is capable of tensile strengths considerably in excess of metals. Glass fibers, however, are frequently restricted in utilization because of an inherent weakness to surface abrasion.

It is a purpose of this invention to provide a novel method for utilizing the strength of glass in fibrous form to reinforce metals while at the same time protecting the fibrous glass against development of weakness by abrasion.

In brief, this is accomplished according to the present invention by combining and surrounding glass fibers with metal in the form of pellets, segments, chips or patties within which the fibers are protected against abrasion during shaping operations. The forms thus produced are then worked to desired shapes in operations such as drawing, rolling, pressing, forging or extrusion which would otherwise be damaging to the glass fibers if the fibers were subjected to such action independently of the composite forms.

It is thus another object of the present invention to incorporate the strengths of glass fibers in metallic bodies of desired shapes with a minimum loss of strength in the glass fibers in order to impart greater strength to the bodies.

The pelletization of glass fibers with metal is successful in minimizing strength loss in glass fibers during the steps of working the metal in that the metal matrix acts as a cushion and/or lubricant for the glass fibers during the often extremely rugged and almost consistent forceful abrasive handling to which metal forms are subjected during shaping.

The novel features which I believe to be characteristic of my invention are set forth with particularity in the appended claims. My invention itself, however, both as to its manner of construction and method of operation, together with other objects and advantages thereof may best be understood by reference to the following description taken in connection with the accompanying drawings, in which:

FIGURE 4 is a somewhat schematic, partially sectional isometric view of another arrangement of apparatus for producing pellets of metal containing glass fibers wherein already formed glass fibers are incorporated into rods of metal prior to pelletization;

FIGURE 5 is an enlarged isometric view of a pellet of the present invention as produced by the method and apparatus of FIGURE 4;

FIGURE 6 is a somewhat schematic, partially sectional isometric view of still another arrangement for producing metal and glass fiber pellets in accordance with the principles of the present invention;

FIGURE 9 is an isometric view partially in cross section of a press having a cavity mold therein within which pellets of metal and glass fibers are deposited for pressure shaping into desired shape;

FIGURE 10 is a side elevational view in cross section of an extrusion press for extrusion of pellets into rods of cross-sectional shape corresponding to that of the press nozzle opening;

FIGURE 11 is a front view of the extrusion press of FIGURE 10 showing the shape of the nozzle opening as illustration of the rod shapes capable of being produced with pellets according to the present invention;

FIGURE 12 is a sectional isometric view of an arrangement for producing patties or bars of metal and glass fibers adaptable to further reshaping; and FIGURE 13 is an isometric view of a pair of mill rolls into which a patty or bar composed of metal and glass fibers, such as is produced by the method and apparatus of FIGURE 11, can be introduced for reshaping to forms such as a channel as illustrated.

In referring to the pelletization or formation of pellets in the present description, no specific geometric form or shape is intended, but rather any composite structural or particulate assembly of metal and glass which can be gathered in an accumulation of similar structures for treatment as mass is intended.

Metal may be worked in accordance with the principles of the present invention in such processes as drawing, rolling, forging, or extrusion either in a non-heated state or while heated to a temperature as high as that at which the glass inclusions are softened sufficiently to permit plastic flow on deformation without disintegration of the metal, the metal also being plastic at such working temperatures. Among the wide range of metals which may be pelletized with glass fibers in such manner are aluminum, lead, zinc, copper, iron, steel, magnesium, etc. In pelletization of these metals they may be incorporated while in an initial stage such as powdered metal or metal shavings which are then pressed into combination with metal coated fibers. Any of a variety of fiberizable glass is subjectable to the pelletization processes of the present invention and as presently known the glass is not limited to any critical formulation.

Figure 1:
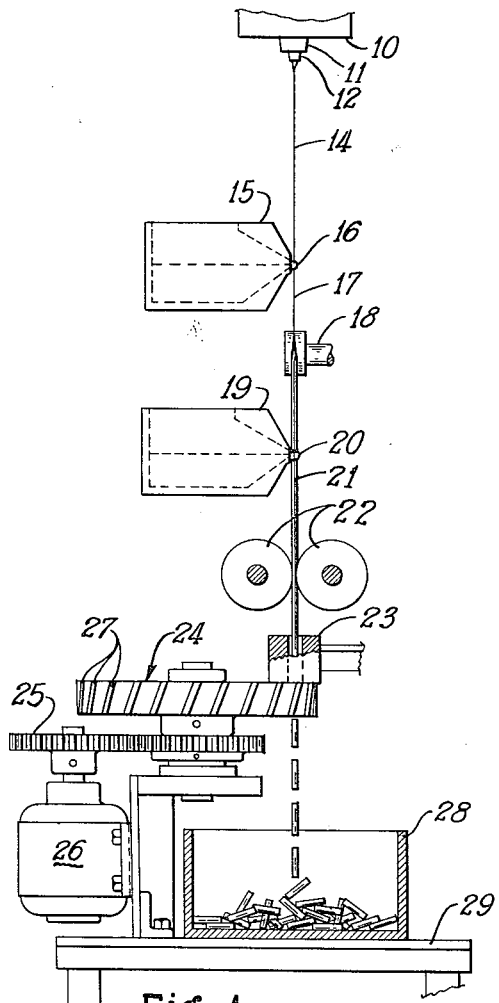
FIGURE 1 is a side elevational view of an arrangement of apparatus for producing pellets of metal and glass fibers produced directly in a fiber forming process.
Figure 2:
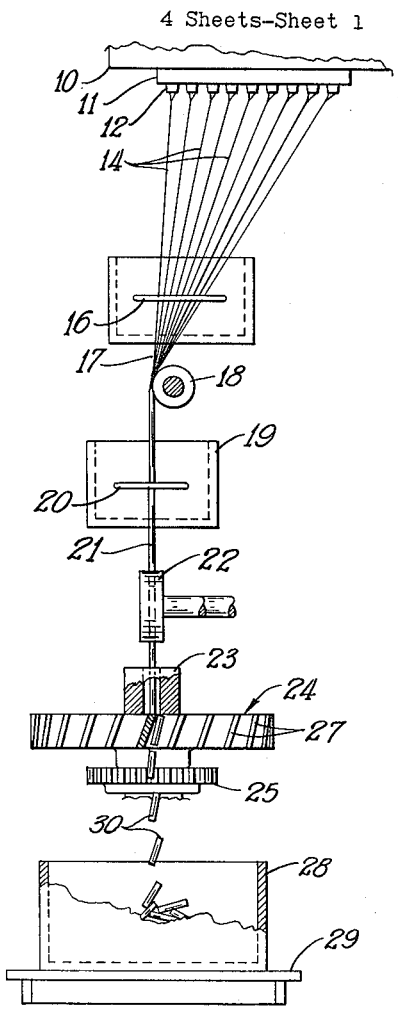
FIGURE 2 is a front elevational view of the apparatus of FIGURE 1.

FIGURES 1 and 2 illustrate an arrangement and method whereby pellets of metal and glass fibers are produced directly in a glass fiber forming process. In this arrangement, a source of molten glass 10 such as melting tank or furnace supplies glass to a feeder 11 having orificed tips 12 therein from which glass fibers 14 are attenuated. Upon formation, the fibers 14 are drawn over the face of a metal-coating applicator 15 similar to the type shown and described in Whitehurst et al. application, Serial Number 322,598, now Patent 2,963,739, issued December 13, 1960, whereby coating metal in molten condition is supported in projected relationship from the face of the applicator in the form of a longitudinal globular strip 16 through which the fibers are drawn for acquisition of a metal coating thereover to form metal coated fibers 17.

The metal coated fibers 17 are gathered or grouped together by passage over a gathering roll 18 and are then redrawn as a strand through a globular strip of metal 20 held in projected relationship in the path of the strand at the face of a second metal-coating applicator 19. In being drawn through a globule of molten metal, the strand of metal coated fibers 17 receives a coating which binds the fibers together into a stick-like grouping 21. The metal which effects the bonding of the metal coated glass fibers into the stick form may be the same as that coated on the fibers, or may be of a different type of higher or lower melting temperature than that of the coating directly on the fibers. If the bonding metal has a higher melting temperature than the coating directly on the glass, it can be readily applied by rapidly drawing the metalled fibers through the globule at such a rate that the air surrounding the stick acts to chill the bonding metal prior to its being effective to melt the direct coating of metal on the glass.

The stick-like form 21 of metal bonded, metal coated fibers 17 is drawn at a relatively rapid rate of speed by a pair of pull wheels 22 which operate to provide the force for attenuation of fibers 14 from the feeder 11. The rate of attenuation is in the order of up to 10,000 feet per minute, or may be as low as 100 feet per minute or lower, if desired. In this respect the speed is not critical since the attenuation rate and rate of coating the fibers is not known to be limited. Upon leaving the pull wheels 22, the stick structure 21 is fed into a tubular shear guide 23 supported in the path of the stick to guide it into a gear-like cutting wheel 24 having cutting teeth 27 which cooperate with the lower edge of the guide 23 to shear off lengths of the stick into pellets 30 illustrated in greater detail in FIGURE 3.

Successive portions of the stick 21, on leaving the lower edge of the guide 23 are engaged by successive cutting teeth 27 of the wheel 24 to effect shearing of the stick into the pellets 30 having a length dependent upon the speed of the stick in its path through the guide 23 and the rate of revolution of the wheel 24. The wheel 24 is driven through a drive pinion 25 by a motor 26. Both the motor 26 and a container 28 to which the pellets 30 are introduced upon cutting are supported by a table structure 29. Upon accumulation in the container 28, the pellets 30 are ready for further use according to processes described hereinafter.

Figure 3:
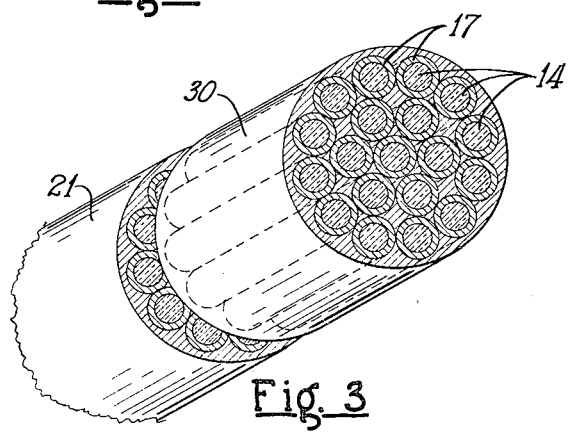
FIGURE 3 is an enlarged isometric view of a pellet of the present invention produced by the method and apparatus of FIGURES 1 and 2.

FIGURE 3 illustrates in greater detail the structural form of a pellet 30 in which the glass fibers 14 are coated with a metal 17 and are bonded together by additional metal. The length of the pellets 30 according to this method may be any of a wide range of lengths the order of ¼″ to 2″ or longer while the diameter of the stick-like form 21 from which they are cut may be in the order of 1/64″ to ¼″ depending upon the thickness of metal coating placed on the individual fibers as well as the number of coated fibers grouped and the thickness of coating applied to the combined grouping of coated fibers.

FIGURE 4 illustrates another arrangement for making metal-fibrous glass pellets wherein glass fibers in strand form, twisted or untwisted, are supplied from packages after having already been formed. The strands 41 are drawn from packages 40 through guide eyes 42 to a bath of molten metal 45 is a suitable high temperature crucible or tank 44. The strands 41 are drawn into the bath 45 in spaced relationship but are gathered into a common grouping over a wheel 48 located under the surface of the bath. The strands are thus each individually coated before being gathered together and are then bonded together into a common metal coated rod-like form 49 which, upon leaving the bath 45, is drawn through a wiping die 50 which assures uniformity in the final dimension of the rod as well as effects a smoothening of the surface thereof.

On leaving the die 50, the bonded rod 49 is drawn through a pair of pull wheels 52 which provide the force for withdrawal of the individual strands 41 from the packages. The pull wheels supply the rod to a shear mechanism comprising a shear block 55 and a blade 54 which cooperate to cut the rod 49 into pellets 56 of desired length. The pellets upon being cut by the shear mechanism are deposited into a container 57 in which they are accumulated for subsequent use in further fabrication of metal structures.

FIGURE 5 illustrates with greater clarity the appearance of the pellets 56 made by the method and apparatus of FIGURE 4 showing the fibrous strands 41 grouped and bonded together by the metal coating the grouped strands. Each individual strand itself is coated in this instance while a complete grouping of metal coated strands is bonded together by the metal coated thereover. The strands 41 can be made of metal coated fibers, if desired, such as are produced by gathering fibers after the first stage of metal coating in the process of FIGURES 1 and 2. In such instance the bath of metal 45 can be of the same metal as is coated on the strand, or can be a different metal adapted to bonding the metal coated strands together. In such case, it will be noted that the metal coated fibers would also first be independently bonded as strands, and then subsequently bonded together as a rod after passage over the guide wheel 48.

Thus far, the pelletization of metal and glass fibers has only been described in relation to formation of pellets from fibers in strand-like form while FIGURE 6 illustrates still another method for forming pellets starting with glass fibers in the form of fabric. Fabric 61 either of woven or unwoven type is drawn from a roll 60 and passed through a molten metal bath 65 in a suitable tank reservoir 64. The fabric is passed under a roll 66 within the bath and after receiving a coating thereof is withdrawn from the bath by passage over an upper supported guide roll 68 at the exterior of the reservoir 64. The coated fabric is then passed through a pair of rolls 70 in a roll stand 69 where a compressive force is exerted thereon to extrude the combination as a sheet of thickness desired. Upon advancement through the rolls 70, the sheet is cut into longitudinal strips 75 by a series of rotary knife blades 72 cooperatively disposed above and below the path of the sheet and spaced apart to provide the widths of strip desired. The strips 75 are introduced to an upper surface of a support 74 upon which they are cut into segments or pellets 76 by a guillotine-type cutter 73 reciprocably operated to cut the strips to length corresponding to the pellet size desired. The pellets 76 are then deposited in a container 77 for accumulation and subsequent fabrication into products as hereinafter described.

Dipping and coating of various weaves of glass cloths, mats, or combinations can be effected in this manner, the coatings being metals or alloys such as aluminum, lead, zinc, etc. For example, a leno cloth can be drawn through a molten metal bath in accordance with this method to produce a continuous sheet of metal reinforced by glass fibers. Variations in the amount of metal to glass in the sheet may be achieved by altering the metal temperature as well as the speed of drawing the fabric through the bath. In this way aluminum or lead which have poor tensile strengths and relatively high coefficients of expansion, can be reinforced to provide the high tensile strengths and lower coefficients of expansion to make them adaptable for use in many applications where they would otherwise be incapable of use.

As still another variation of this concept, a non-woven mat of glass fibers may be carried by a woven fabric such as leno fabric, and upon passage through the bath of molten metal can be made to form a composite of metal sheet reinforced by both a woven and non-woven fabric. In this way glass fibers are arranged in an oriented as well as non-oriented manner within the plane of the sheet of metal to provide tensile strengths in all directions of the plane of the sheet.

To promote wetting of the fabric 61 upon passage through the molten metal bath 65, differential temperatures may be established through the depth of the bath. In accordance with this principle the upper levels of the bath are maintained at a somewhat lower temperature than the bottom of the bath. For example, if the depth of the bath were in the order of 15" to 20", the upper surface might be at a temperature in the order of 1250° F. while the bottom of the bath is at a temperature of 1500° F. Upon passage of the fabric into the bath, it is thus brought up in temperature gradually as it approaches the lower level, rather than being subjected to the high temperature immediately. The lower viscosity of the molten metal at the higher temperatures at the bottom of the tank lends itself to penetration of the fabric and then as it moves upwardly to cooler zones at the upper level of the bath, the impregnated material is more susceptible to acceptance of the coating of metal throughout its thickness. Upon leaving the upper zones of the bath at a lower temperature, the coating can be arranged to be sufficiently adhering to the mass that dripping of the material from the fabric will not take effect. In this way shock heating and cooling of the fabric to the degree which it might otherwise be subjected is avoided while at the same time providing the degree of penetration by metal to provide a matrix for the sheet is effected. To further promote the compatibility of glass fibers with the molten metal, a flux can be provided at the surface of the metal bath through which the fabric or mat is introduced prior to passage through the bath. Oxidation at the surface of the bath can thus be reduced and the more intimate association between the glass and metal can be established.

In other instances where the fabric is of non-woven type and a shift of fibers therein is likely to occur, perforation of the fabric may be resorted to to promote more positive adherence of the metal to the fabric. By providing perforations in the fabric, slugs of metal are formed at each perforation by reason of a web and then a slug being formed therein during the dipping step thereby providing anchors or keys for fibers intersecting the slugs. The coating of metal on the fabric is thus fixed relative to the anchors, minimizing the possibility of shift between the fibers and the metal in the final coated fabric. A suitably chosen pattern of perforations in the fabric minimizes fiber or strand movement to the degree that loads can be imparted to the reinforcement material before the disruption limit of the metal film is reached.

Figure 7:
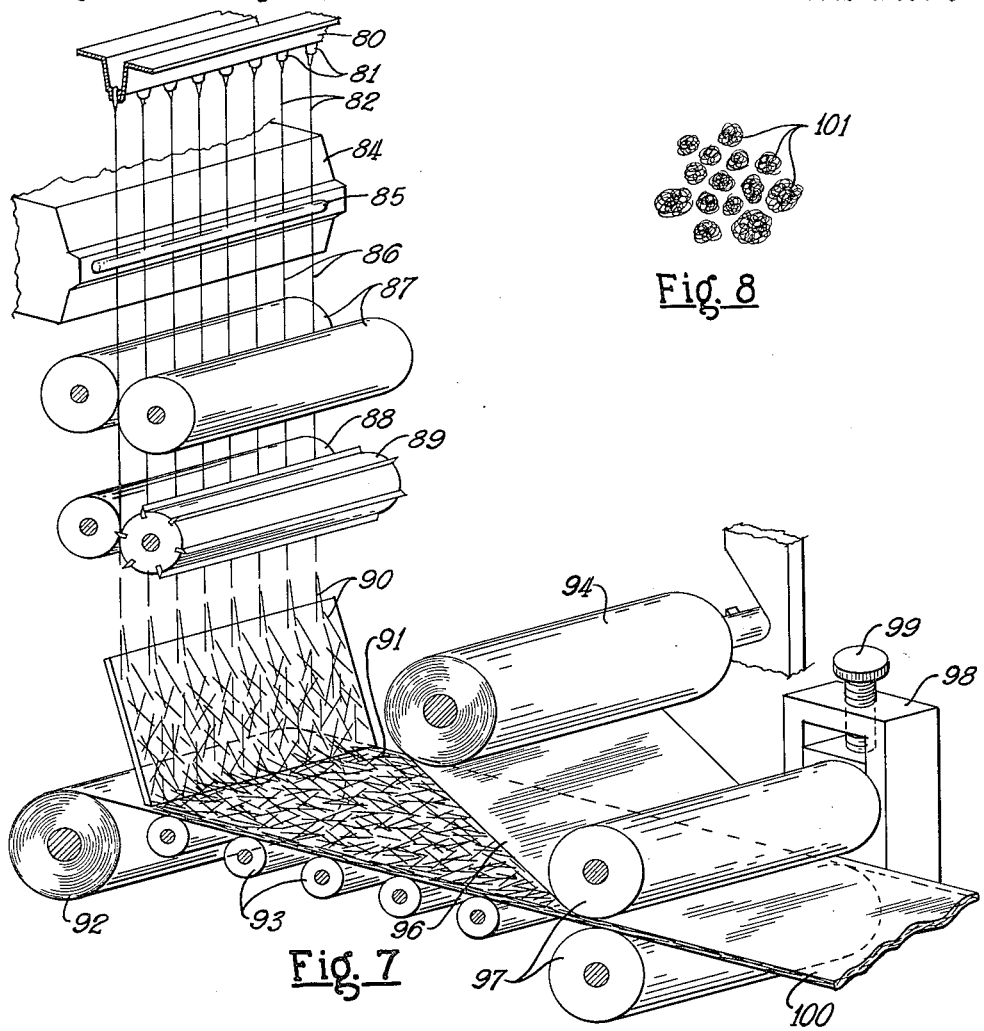
FIGURE 7 is a schematic view of an arrangement for producing an extruded sheet structure of metal and glass fibers adaptable to fabrication of pellets.

FIGURE 7 illustrates another arrangement for producing metal sheets reinforced with glass fibers adaptable to formation of pellets. In this arrangement glass fibers 82 are attenuated from orificed tips 81 in a feeder 80 associated with a molten glass supply source. The fibers are drawn across the face of a metal coating applicator 84 having a quantity of molten metal 85 projecting in the path of the fibers for application of a coating to the fibers. Coated fibers are drawn by a pair of co-acting pulling rollers 87 which supply the force for attenuation of the fibers 82 and also advance the fibers to a chopping device including a rubber back-up roll 88 and a bladed chopping roll 89 which cooperatively engages the coated fibers to chop them into short lengths for collection on the metal sheet or foil 91 passed under the chopping device. The chopped coated fibers are deposited on a metal sheet or foil 91 by way of a baffle member 90 inclined downwardly to the sheet or foil and disposed angularly in the path of the dropping chopped fibers. The member 90 promotes uniform distribution on the sheet or foil and, if desired, may have an associated air blast directed thereagainst over its upper surface to assure uniform removal in those instances where hang-up may tend to occur.

The sheet or foil 91 is withdrawn from a roll 92 and passed over a series of spot rollers 93 in the zone where the chopped coated fibers are deposited and conveyed prior to introduction into a roll stand 98. Before introduction of the sheet 91 and the fiber conveyed thereon into the roll stand, another metal sheet or foil 96 is laid thereover to cause the chopped coated fibers to become sandwiched interposed between the two sheets. The sheet or foil 96 is withdrawn from a roll 94 disposed behind the roll stand 98 and above the path of movement of the sheet 91. The roll stand 98 includes a pair of compression rolls 97 adjustable in degree of compression by an adjustment screw 99. The assembly of two sheets 91 and 96 with chopped fibers therebetween is passed between the compression rolls under adequate pressure to establish an intimate integral relationship between the three components to form an extruded metallic structure 100 reinforced by the fibers therebetween.

In addition to the formation of pellets in the manner of pelletizing the reinforced sheet produced in the arrangement of FIGURE 7, the composite sheet structure 100 is adaptable to end uses such as finishing of wall surfaces, both interior and exterior, roofing surfaces, and reinforcement of other materials. The two sheets brought together to form the composite structure can be of different metals or the same metal, while the coating metal of the chopped coated fibers can be the same or different from that of the sheets. The thickness of the sheets is usually identical but may be of different thicknesses, if desired. In this respect the bottom sheet might be more rigid with the top sheet being flexible, and upon combination into the composite structure being reinforced by the coated glass fibers can be made still more rigid. Two flexible metallic sheets joined together in this way can likewise be joined to produce a rigid or plate-like structure. Although chopped coated fibers have been illustrated as being interposed between two sheets in this arrangement, it will be recognized that continuous coated fibers can also be incorporated between two sheets to produce a composite reinforced product according to these principles.

In addition to the foregoing methods of establishing an intimate relation between two flexible sheets of metal adaptable to later pelletization, it will be recognized that more than two sheets of metal might be built into a composite in this way to produce a more rigid final sheet of metal having corresponding strength properties. Each additional layer under such circumstances would have metal coated fibers interposed between it and the adjacent underlayer of metal with which it is associated. Additionally, powdered metal might be incorporated in between layers of metal together with the metal coated fibers to promote increased adherence between the joined sheets as well as to fill in voids between metal coated fibers. Still further, the metal coated fibers interposed between metal sheets prior to introduction between extrusion rolls may be in the form of a mat of coated fibers of the type such as might be produced in the arrangement of FIGURE 6 prior to being pelletized.

Figure 8:
FIGURE 8 is an illustration of another type of pellet adaptable to use in accordance with the principles of the present invention.

FIGURE 8 illustrates another type of pellet adaptable to fabrication into metal products reinforced by glass fibers. The pellets of this arrangement comprise chopped metal coated fibers of the type produced in the arrangement of FIGURE 7 which are, in a sense, balled or nodulated into the pellets 101. Such pelletization can be accomplished in a ball-type mill wherein the metal coated fibers are accumulated and rolled into the pelletized forms and then withdrawn ready for further processing. In still another method, pelletization can be accomplished by introduction of metallized fibers or roving between a pair of closely spaced belts operating at differential speeds. Fibers or roving of considerable length coated with metal are adaptable to pelletization in this manner as well as chopped fibers of short length. In the latter instance each pellet is formed of an accumulation of a number of the chopped fibers, while in the case of the longer metal coated fibers, each length of fiber can be nodulated into a single pellet.

Still another method of making pellets involves the use of short glass fibers or ground glass mixed with fine metal powders subjected to pressure at elevated temperatures to sinter and form dense integrated mixtures. If the sintering and hot working temperatures of the metal are above the softening point of the glass used, such sintered pellets can be hot extruded or hot rolled. The fibers of the pellets are further attenuated during such operations while ground glass becomes fiberized under the high pressures exercised during the processes. The resultant glass reinforced metal has a superior high temperature character with lower yield characteristics than unreinforced metals. Powders of copper, iron, nickle, stainless steel and numerous other alloy powders can thus be incorporated in pellets for further fabrication. By way of example, pellets containing 50% by weight of chopped one mil glass fibers and the remainder in copper powder form can be pelletized into sintered pellets at a temperature of 1650° F. under a pressure of 14,000 p.s.i. applied for 30 minutes.

FIGURE 9 illustrates the manner in which pellets of the present invention can be processed into metal products reinforced by glass fibers. In this arrangement the pellets 105 are introduced into a mold cavity for application of compressive forces between two halves of a mold 103 and 104 inserted between the platens 106 and 108 of a press. Upon compression of the pellets within the mold cavity, it is preferable that the mold be heated so as to impart a condition of plasticity to the metal to permit more ready flow thereof into an integrated matrix for the glass fibers while at the same time conforming to the contours of the mold. In some instances, it is desirable to heat the pellets to a degree of plasticity in the glass fibers as well as in the metal in order to cause a distribution of the glass fibers through the contoured matrix especially when the molded products are of intricate contoured shape. If the pressure exerted upon the pellets, however, is of sufficient magnitude, the flow of metal within the mold can be effected even when cool. In the case of application of heat to the pellets, however, it has been found desirable that the temperature be applied for a period during application of pressure to effect a soaking to permit uniform pressure distribution and to eliminate or minimize the possibility of voids in the final molded product.

To permit application of working pressures upon pellets according to the present principles without damaging fibers incorporated therein, sufficient metal is provided to prevent abrasion of fibers against one another during the application of pressure forces. Additionally, plastic flow can be effected by application of sufficient pressure after raising the temperature of the matrix to within approximately ⅔ to ⅘ of the absolute melting point of the metal or alloy used. Sufficient time is also allowed under pressure to cause uniform distribution of forces to eliminate voids. A thermal equilibrium through the accumulated pellets is further desired to minimize tendencies toward breakage of fibers. If these principles are followed, the metal surrounding the fiber acts as a lubricant to prevent fiber damage and in turn the strength of the fibers is imparted to the product made with the pellets.

To minimize the possibility of voids in some instances of molding, powdered metal can be incorporated with the pellets to promote the intimacy of metal particles prior to application of pressure. If the metal in powdered form and as coatings on the fibers is copper and is a predominant portion of the material in the mold cavity, that is more than 50% by weight; and the mixture is stirred well to effect intimate contact between the metal particles and the metal coated glass fibers, a sintered product molded in conformity with the cavity can be produced. Metal such as aluminum and copper have proven quite successful for production of sintered products of this type. In still other instances, powdered glass can be incorporated in the accumulation of metal pellets reinforced by glass fibers. In such instances, application of pressure to the accumulation when at a high temperature results in distribution of the glass particles in extended form through the metal matrix forming actual and close semblances of glass fibers which become active in reinforcing the metal product.

FIGURES 10 and 11 illustrate an extrusion press 110 from which pellets 112 of metal reinforced with glass fibers can be extruded into bar-type forms of various shapes such as a bar 113 upon application of pressure by way of a piston 111 of the press. The temperature of the press is maintained at a value such that the pellets acquire a degree of plasticity on emission from the press nozzle to bring the metal of the pellets in intimate relationship as a matrix for the glass fibers. Powdered metal may be incorporated with the pellets, if desired, as well as powdered glass, but preferably sufficient metal is provided in the pellets such that a mixture of other particles is unnecessary.

FIGURE 12 illustrates a method whereby patties or rod-type bars of metal reinforced by glass fibers may be produced for fabrication into products such as a channel extruded in the manner illustrated in FIGURE 13. In the arrangement of FIGURE 12, either metal coated glass fibers or bare glass fibers are inserted in a holder 120 which has a foraminous seat 121 at its bottom having a suction chamber 124 thereunder from which air is withdrawn through a tube 125 connected to a vacuum pump, not shown. The glass fibers are compacted in the holder to conform to the general shape of the cavity of the holder, after which molten metal 128 is poured from a crucible 126 for impregnations and coverage of the mass of fibers. The metal 128 is distributed over the surface of the compacted mass of fibers and is caused to be drawn into the mass by the forces of gravity as well as the forces created by establishment of the low pressure zone below the mass in the chamber 124. Enough metal is poured into the recess of the holder to cause complete distribution through the mass, while the mass of fibers deposited in the holder is limited in depth so that sufficient forces exerted on the metal poured on the mass to draw it to the lower levels of the mass of fibers. Upon solidification, a metal patty or bar results having glass fibers distributed throughout and shaped to lend itself to further fabrication.

By way of example, patties of aluminum containing reinforcing fibers can be formed to desired shapes by raising the temperature of the patty to 600° F. and subjecting it to pressures in the order of 80,000 p.s.i. When a lead-cadmium-zinc alloy patty containing continuous glass fibers is used, it may be formed to desired shapes at a temperature of 400° F. under pressures in the order of 20,000 p.s.i. When a zinc patty is used with continuous glass fibers reinforcing the form, a temperature of 500° F. and a pressure of 40,000 p.s.i. will produce desired shapes in a die.

The patties or the rod-type bars may be machined into chips or otherwise to turnings by various milling, lathe turning, or rough grinding methods. Premolding of notches into the patties, rods, or sticks may be done as desired to aid in such subdivision steps.

A bar or patty of metal reinforced with glass fibers can be passed through a pair of rolls such as rolls 130 and 131, respectively, having grooves 132 therein properly shaped and positioned to produce a channel member of the bar 134 on passage therethrough. In a sense, the rolling of the patty or bar to the shape desired is conventional in that it resembles processes utilized in rolling various shapes from ingots. Correspondingly the rolling process is effected while the bar 134 is hot to the extent that the material thereof is plastic and conformable to the roll contours. It should be noted that the temperature of the bar for extrusion is not limited to metals having extrusion temperatures below the softening temperature of the glass fibers used. Under the high pressures of such extrusion processes, the glass will remain in fiber form of various lengths even when in plastic condition in view of the fact that the pressure exerted acts to elongate particles of material in plastic form within bars during such processes, thus resulting in retention of the fibrous form regardless of the fact that the temperature of the bar is above the softening temperature of the glass fibers.

Metal coated fibers or rovings, chopped or continuous, as well as bare glass fibers or rovings, chopped or continuous, can be incorporated in patties or bars of this type and can be fabricated into rods, bars, plates, sheets, channels and I-beams and other structural shapes in further metal working steps such as pressing, extrusion or rolling. Powdered metal, or powdered glass can also be incorporated in patties of glass fibers in methods such as are exemplified in FIGURE 12, prior to pouring of metal 128 thereover. Further with regard to the arrangement of FIGURE 12, the holder 120 can be heated to a temperature sufficient to assure flow of molten metal introduced thereto to the bottom of the mass of fibers, in those instances where difficulty is experienced in this regard.

It will be appreciated that the pellets or small units of glass reinforced metal which are provided by the invention offer a desired convenience to the metal fabricator who is concerned with forming a metal article from any given metal reinforced with glass. The direct introduction of glass into metal is both inconvenient generally to metal fabricators and involves working with bulky masses in some cases. Where it is desired to preserve the advantages of freshly formed glass surfaces, this also cannot be done as the metal fabricator is expected to work with glass fibers that have been processed and made elsewhere.

By the invention there is prepared a unit article which can be conveniently shipped, stored, or fed into metal fabricating operations and as a pellet, segment, or small chip, stick, nodule, or mass, the composite of glass fibers and metal is provided in a form readily adaptable to extrusion, pressing, or shaping by various means of compacting either under heat and pressure or pressure alone.

Where the pellet is made of an elongated stick form by methods such as are illustrated in FIGURES 1 to 5 herein, the glass fibers are parallel in arrangement with respect to each other. It is obvious that under a compacting process that these sticks will generally arrange themselves also parallel with respect to each other thus giving a product in which most of the glass fibers will be found in alignment and in one direction. It is a specific advantage, however, of the invention that metal masses which are made with substantially squared, cubical or spherical pellets are characterized in that the fibers in the adjacent areas corresponding to the original pellets carry glass fibers which lie at all different angles thus giving a compacted glass fiber reinforced metal article wherein the glass fibers are either completely non-oriented or are oriented only in small discrete areas adjacent to other areas where the fibers are oriented in an entirely different direction. By such means, metal masses may be made wherein the physical properties do not change with respect to the direction through the mass being tested.

In view of the foregoing description, it will be understood that changes may be made in the details of the various forms of the invention illustrated herein without departing from the spirit of the invention, especially as defined in the following claims.

I claim:

1. A method for producing glass reinforced metal articles comprising forming relatively short segments of metal each having a plurality of short glass fibers distributed therethrough, applying heat to said segments sufficient to establish a condition of plasticity in the metal thereof, and applying sufficient pressure to said heated segments as a mass to work them into integrated relationship with the metal of the segments forming the matrix of a body of desired shape reinforced by said fibers.

2. A method for producing glass reinforced metal articles comprising metal coating each of a multiplicity of continuous glass fibers, severing said coated fibers into short lengths grouping the short length coated glass fibers and bonding them together with metal into pellets of size adaptable to pressure working with other such pellets as a mass, and pressure working said pellets as a mass to form the metal matrix of a body of desired shape reinforced by said fibers.

3. A method for producing articles of glass reinforced metal comprising accumulating into a mass a plurality of short metal pellets each having a plurality of generally parallel short glass fibers distributed therethrough, and pressure working said short pellets into an integral reinforced metal body of shape desired comprising a metal matrix formed of the metal of said pellet and being reinforced by said short glass fibers.

4. A method for producing glass reinforced metal articles comprising accumulating into a mass a plurality of metal pellets each having glass fibers distributed therethrough, intermixing metal in particulate form into said mass with said pellets, and applying heat and pressure to said mass sufficient to work said mass into an integrated body according to a desired shape comprising a metal matrix reinforced by said glass fibers distributed throughout.

5. A method for producing articles of glass reinforced metal comprising stacking sheets of metal, distributing a mass of metal segments each reinforced by at least one glass fiber in interposed relation between each adjacent pair of said sheets, each said segment incorporating at least one glass fiber, intermixing metal powder with said metal segments between said sheets, and applying heat and pressure to said stacked sheets to effect an integration thereof with said metal segments and powder into a composite metal body reinforced by the fibers of said segments.

6. A fibrous glass reinforced body comprising a plurality of metallic segments of small dimension, each said segment having at least one glass reinforcing fiber therein and each glass fiber of said segments being fully enclosed in the metal of its respective segment, said segments being of relatively small size adaptable to mass handling being joined together in random arrangement into a monolithic matrix of metal reinforced by the fibers of said segments.

7. A metallic pellet adaptable to pressure working with similar pellets into a common body comprising a plurality of short lengths of glass fibers, said lengths of fibers being arranged in parallel slightly spaced relationship, and each being surrounded by the metal matrix of said pellet.

8. A metallic pellet adaptable to pressure working with similar pellets into a common body comprising a plurality of short lengths of fibrous glass strand, said short lengths of strand being arranged in parallel slightly spaced relationship, and each being surrounded by the metal matrix of said pellet.

9. A method for producing glass reinforced metal articles comprising accumulating into a mass a plurality of metal pellets each having glass fibers distributed therethrough, intermixing glass in powdered form with said pellets, and applying heat and pressure to said mass sufficient to work said mass into an integrated body causing the metal of said pellets to form the matrix of said body with said fibers and powdered glass distributed therethrough.

(References on following page)

References Cited by the Examiner

UNITED STATES PATENTS

| | | | |
|---|---|---|---|
| 2,559,572 | 7/51 | Stalego | 65—7 |
| 2,616,165 | 11/52 | Brennan | 136—19 |
| 2,699,415 | 1/55 | Nachtman | 156—167 |
| 2,717,946 | 9/55 | Peck | 338—258 |
| 2,848,390 | 8/58 | Whitehurst et al. | 65—3 |
| 2,915,806 | 12/59 | Grant | 161—93 |
| 2,938,821 | 5/60 | Nack | 156—47 |
| 2,939,207 | 6/60 | Adler | 29—195 |
| 2,953,849 | 9/60 | Morgan | 29—419 |
| 2,961,758 | 11/60 | Slayter | 29—419 |
| 2,971,095 | 2/61 | Drummond | 250—108 |
| 3,019,515 | 2/62 | Whitehurst | 29—195 |
| 3,038,248 | 6/62 | Kremer | 29—419 |

WHITMORE A. WILTZ, *Primary Examiner.*

CARL KRAFFT, THOMAS H. EAGER, *Examiners.*